United States Patent
Voleti et al.

(10) Patent No.: US 10,878,043 B2
(45) Date of Patent: Dec. 29, 2020

(54) CONTEXT IDENTIFICATION FOR CONTENT GENERATION

(71) Applicant: eBay Inc., San Jose, CA (US)

(72) Inventors: Suman Voleti, Milipitas, CA (US); Nishith Parikh, Fremont, CA (US); Neeraj Garg, Sunnyvale, CA (US); Sathishkumar Veeraraghavan, San Jose, CA (US)

(73) Assignee: eBay Inc., San Jose, CA (US)

( * ) Notice: Subject to any disclaimer, the term of this patent is extended or adjusted under 35 U.S.C. 154(b) by 204 days.

(21) Appl. No.: 15/410,897

(22) Filed: Jan. 20, 2017

(65) Prior Publication Data

US 2017/0212957 A1 Jul. 27, 2017

Related U.S. Application Data

(60) Provisional application No. 62/286,123, filed on Jan. 22, 2016.

(51) Int. Cl.
*G06F 16/951* (2019.01)
*G06F 16/9535* (2019.01)
*G06F 16/958* (2019.01)

(52) U.S. Cl.
CPC .......... *G06F 16/951* (2019.01); *G06F 16/958* (2019.01); *G06F 16/9535* (2019.01)

(58) Field of Classification Search
CPC .......... G06F 17/30864; G06F 17/2785; G06F 17/30324; G06F 17/3053; G06F 17/30867;

(Continued)

(56) References Cited

U.S. PATENT DOCUMENTS

| 2003/0055729 A1* | 3/2003 | Bezos | G06Q 30/02 705/14.31 |
| 2008/0294622 A1 | 11/2008 | Kanigsberg et al. | |

(Continued)

FOREIGN PATENT DOCUMENTS

WO  WO-2017127616 A1  7/2017

OTHER PUBLICATIONS

"International Application Serial No. PCT/US2017/014238, International Search Report dated Mar. 30, 2017", 2 pgs.

(Continued)

*Primary Examiner* — Ashish Thomas
*Assistant Examiner* — Suman Rajaputra
(74) *Attorney, Agent, or Firm* — Shook, Hardy & Bacon LLP

(57) ABSTRACT

Methods, systems, and computer programs are presented for identifying data representations across multiple network assets and generating content responsive to the representations. A method includes receiving a set of queries comprising a first set of keywords and identifying a set of results within a first database where the set of results includes a set of publications with an identification and a title. The method generates an association between the first set of keywords and the identifications and titles of the set of publications. The method generates a first association among keywords of the first set of keywords based on user activity received in response to identifying the set of results. The method identifies a second set of keywords based on the first set of keywords and associates the second set of keywords with the first set of keywords within the first database.

20 Claims, 11 Drawing Sheets

(58) Field of Classification Search
CPC .............. G06F 17/30637; G06F 16/951; G06F 16/958; G06F 16/9535; G06Q 30/02; G06Q 30/0241
See application file for complete search history.

(56) References Cited

U.S. PATENT DOCUMENTS

| | | |
|---|---|---|
| 2011/0004607 A1 | 1/2011 | Lokam et al. |
| 2012/0239667 A1 | 9/2012 | Vysyaraju et al. |
| 2013/0246322 A1 | 9/2013 | De Sousa |
| 2014/0201180 A1* | 7/2014 | Fatourechi .......... G06F 16/2453 707/706 |
| 2014/0214817 A1* | 7/2014 | Hu .................... G06F 17/30675 707/723 |
| 2014/0337156 A1 | 11/2014 | Dorr |
| 2016/0012507 A1* | 1/2016 | Narin ....................... G06F 16/84 705/26.61 |
| 2016/0266738 A1* | 9/2016 | Martello ................ G06Q 40/08 |
| 2016/0371361 A1* | 12/2016 | Chino ................... G06F 16/285 |

OTHER PUBLICATIONS

"International Application Serial No. PCT/US2017/014238, Written Opinion dated Mar. 30, 2017", 6 pgs.
International Preliminary Report on Patentability received for PCT Application No. PCT/US2017/014238, dated Aug. 2, 2018, 8 pages.
Extended European Search Report Received for European Patent Application No. 17741975.1, dated May 28, 2019, 11 pages.
Anonymous, "The Ultimate Google Keyword Planner Tutorial", Retrieved from the Internet: URL:https://web.archive.org/web/20151031061556/https://www.randombyte.com/ultimate-google-keyword-planner-tutorial/, XP055590543, Oct. 31, 2015, 12 pages.
Response to Extended European Search Report filed on Oct. 28, 2019 for European Patent Application No. 117741975.1, dated May 28, 2019, 23 pages.
Office Action received for Korean Patent Application No. 10-2018-7024214, dated Feb. 19, 2020, 21 Pages (11 pages of Official copy and 10 pages of English Translation).
Response to Office Action filed on Apr. 27, 2020 for Korean Application No. 10-2018-7024214, dated Feb. 19, 2020, 44 pages (37 pages of official copy & 7 pages of English Translation of claims).
Communication Pursuant to Article 94(3) EPC received for European Patent Application No. 17741975.1, dated Aug. 18, 2020, 11 pages.

\* cited by examiner

602

TOP BUYING INTENTS

SHOW [10 ▽] ENTRIES     606⤵    608⤵    618⤵    SEARCH: [  ] ⟵610

| KEYWORD ⟵604 | ⇅RECALL ⓘ | ⇅DEMAND ⓘ | ⇅COUNT ⓘ | ⇅RANK ⓘ |
|---|---|---|---|---|
| BABY MONITOR | 6470 | 6470 | 6470 | NR |
| VIDEO BABY MONITOR | 2307 | 2307 | 2307 | NR |
| BABY MONITOR CAMERA | 2008 | 2008 | 2008 | NR  612 |
| BABY CAMERA | 2007 | 2007 | 2007 | NR |
| MOTOROLA BABY MON... | 577 | 577 | 577 | 9 |
| AUDIO BABY MONITOR | 1130 | 1130 | 1130 | NR |
| WIFI BABY MONITOR | 594 | 594 | 594 | NR |
| BABY MONITOR WIRELESS | 1764 | 1764 | 1764 | NR |
| SUMMER BABY MONITOR | 977 | 977 | 977 | NR |
| MOTOROLA MBP36 | 94 | 94 | 94 | 7 |

SHOWING 1 TO 10 OF 1,000 ENTRIES      [PREVIOUS][1][2][3][4][5]...[100][NEXT]

▽TOP ATTRIBUTES ⟵614

SHOW [10 ▽] ENTRIES      ASPECT      SEARCH: [  ]

| ASPECT NAME ⟵620 | ⇅ VALUE ⓘ | ⇅PURCHASE COUNT ⓘ |
|---|---|---|
| [FILTER BY ▽] | | |
| PT | BABY MONITORS | 33173 |
| BRAND | SUMMER INFANT | 7669 |
| BRAND | MOTOROLA | 7163 |
| COUNTRY/REGION OF MFG. | CHINA | 5364 |
| BRAND | VTECH | 1726 |
| BRAND | INFANT OPTICS | 1219 |
| BRAND | ANGELCARE | 1198 |
| COLOR | WHITE | 1058 |
| BRAND | LEVANA | 1048 |
| BRAND | SAFETY 1ST | 1038 |

SHOWING 1 TO 10 OF 96 ENTRIES      [PREVIOUS][1][2][3][4][5]...[100][NEXT]

▽RELATED SEARCHES ⟵616

| QUERY | RANK | QUERY | RANK |
|---|---|---|---|
| BABY MONITOR | 1 | SAMSUNG BABY MONITOR | 1 |
| VIDEO BABY MONITOR | 2 | VIDEO MONITOR | 2 |
| MOTOROLA BABY MONITOR | 3 | MOTOROLA MBP | 3 |
| SUMMER INFANT VIDEO MON... | 4 | SUMMER INFANT BABY TOUCH | 4 |
| SUMMER BABY MONITOR | 5 | MOTOROLA VIDEO BABY MON... | 5 |
| ANGELCARE | 6 | BABY MONITOR CAMERA | 6 |

*FIG. 6*

▽ TOP BUYING INTENTS

SHOW [10 ▽] ENTRIES
KEYWORD ~802

| | ⇅ RELEVANT VI COUNT |
|---|---|
| 4TH OF JULY DECORATIONS | 9892.7583 |
| 4TH OF JULY | 3984.6969 |
| 4TH OF JULY POSTCARD | 2936.2745 |
| 4TH OF JULY WREATH | 2375.2951 |
| 4TH OF JULY CLOTHES FOR WOMEN | 1940.5092 |
| 4TH OF JULY SHIRT | 1560.7143 |
| 4TH OF JULY LIGHTS | 1314.74 |
| 4TH OF JULY DRESS | 889.8093 |
| PATRIOTIC WREATH | 880.8889 |
| 4TH OF JULY T SHIRT | 707.6446 |

SHOWING 1 TO 10 OF 2,845 ENTRIES

PREVIOUS | 1 | 2 | 3 | 4 | 5 | ... | 285 | NEXT

▽ TOP CATEGORIES

SHOW [10 ▽] ENTRIES     SEARCH: [    ] ~804

| LEAF CATEGORY | ⇅ VIEW COUNT |
|---|---|
| HOME & GARDEN: HOLIDY & SEASONAL DECOR: JULY 4TH & SUMMER | 44562 |
| CLOTHING, SHOES & ACCESSORIES: MEN'S SHOES: ATHLETIC | 30610 |
| COLLECTIBLES: HOLIDAY & SEASONAL: JULY 4TH | 19470 |
| TICKETS & EXPERIENCES: CONCERT TICKETS | 17573 |
| CLOTHING, SHOES & ACCESSORIES: WOMEN'S CLOTHING: TOPS & BLOUSES | 13387 |
| CLOTHING, SHOES & ACCESSORIES: MEN'S CLOTHING: T-SHIRTS | 12337 |

FIG. 8

CONTEXT IDENTIFICATION FOR CONTENT GENERATION

PRIORITY

This application is a Non-Provisional of and claims the benefit of priority from U.S. Provisional Application Ser. No. 62/286,123, entitled "CONTEXT IDENTIFICATION FOR CONTENT GENERATION," filed on Jan. 22, 2016, which is incorporated herein by reference in its entirety.

BACKGROUND

Conventionally, search engine optimization methods require identification of search techniques and trends in an effort to identify words and phrases to increase visibility of a given web page.

BRIEF DESCRIPTION OF THE DRAWINGS

Various ones of the appended drawings merely illustrate example embodiments of the present disclosure and cannot be considered as limiting its scope.

FIG. 6 is an example interface diagram illustrating a user interface screen of a content generation system, according to various embodiments.

FIG. 8 is an example interface diagram illustrating a user interface screen of a content generation system, according to various embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, methods and systems for a content generation system are presented. The content generation system accesses contextual data in the form of keywords and publications to identify gaps in a set of publications and opportunities to increase publication visibility within a publication system and search engine systems. In search engine optimization (SEO), content is one of the top SEO factors to drive traffic from any search engine to a publication system. In order to optimize visibility within a search engine, content may be generated or modified, but previous systems have offered no indication as to the type of content to create or a method to optimize or prioritize content on the page. SEO efforts may be improved by identifying types of content to create and methods to modify content to address different user intents and drive SEO traffic.

In some embodiments described herein, the methodologies contained describe ways to generate content, enabling author involvement and curation, while identifying and generating context to aid the author or curator. In some embodiments, the methodologies described herein identify gaps between user interest in a publication system and an external search system and suggest topics for creation. The methodologies may also enable content authors to find relevant vocabulary and knowledge for topics for on-page content optimization. These methods may enable creation of guides and collection pages to cover gaps in publication system content. The methods described herein may optimize vocabulary used on guides, browse pages, RPP pages (e.g., retail promotional platform pages), and selling pages by suggesting vocabulary to be used on the page or generating or modifying the pages automatically, without user (e.g., author or curator) interaction with the page. The methods can also be used in placements such as page metadata, Left Navigation modules, titles and headers, and text blurbs or descriptions of the page. The methods may also be used for identifying keywords for paid search campaigns.

Figure 1:
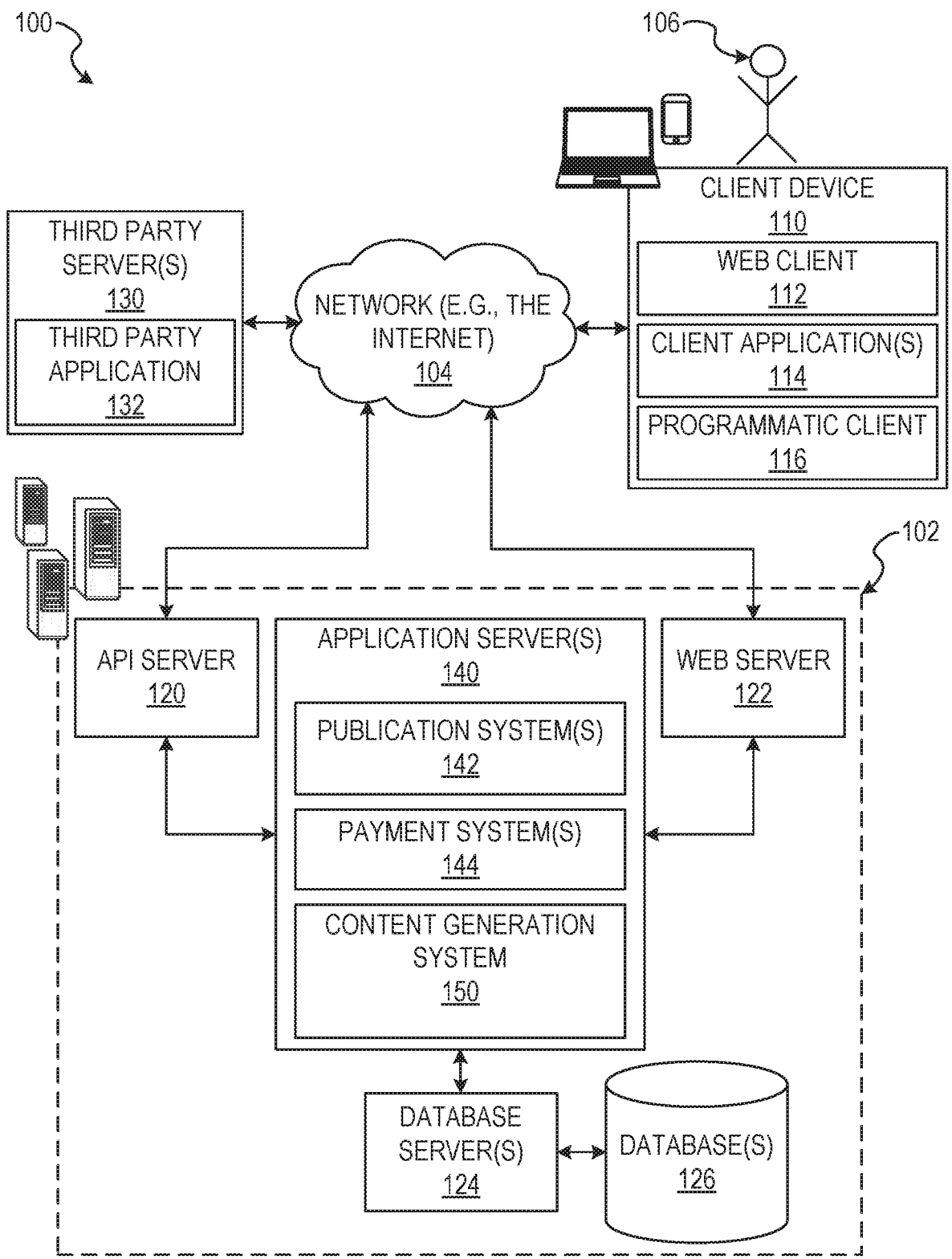
FIG. 1 is a block diagram illustrating a networked system, according to some example embodiments.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer@ browser developed by Microsoft® Corporation of Redmond, Wash. State), a client application 114, and a programmatic client 116 executing on client device 110.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or databases 126. In an example embodiment, the databases 126 are storage devices that store information to be posted (e.g., publications or listings) to the publication system 142. The databases 126 may also store digital item information in accordance with example embodiments.

Additionally, a third-party application 132, executing on third-party servers 130, is shown as having programmatic access to the networked system 102 via the programmatic interface provided by the API server 120. For example, the third-party application 132, utilizing information retrieved from the networked system 102, supports one or more features or functions on a website hosted by the third party. The third-party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The content generation system 150 may provide functionality operable to perform various content generation and search engine optimization functions. For example, the content generation system 150 accesses the present keywords and publication pages from the databases 126, the third-party servers 130, the publication system 142, the client device 110, and other sources. In some example embodiments, the content generation system 150 analyzes the keywords and publications to determine gaps within the publications with respect to keywords, context, or keyword ranks. In some example embodiments, the content generation system 150 communicates with the publication systems 142 (e.g., accessing item listings or other published documents, pages, or information on the publication system 142). In an alternative embodiment, the content generation system 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and content generation system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third-party application 132, executing on a third-party servers 130, is shown as having programmatic access to the networked system 102 via the programmatic interface provided by the API server 120. For example, the third-party application 132, utilizing information retrieved from the networked system 102, may support one or more features or functions on a website hosted by the third party. The third-party website may, for example, provide one or more promotional, marketplace, or payment functions that are supported by the relevant applications of the networked system 102.

Figure 2:
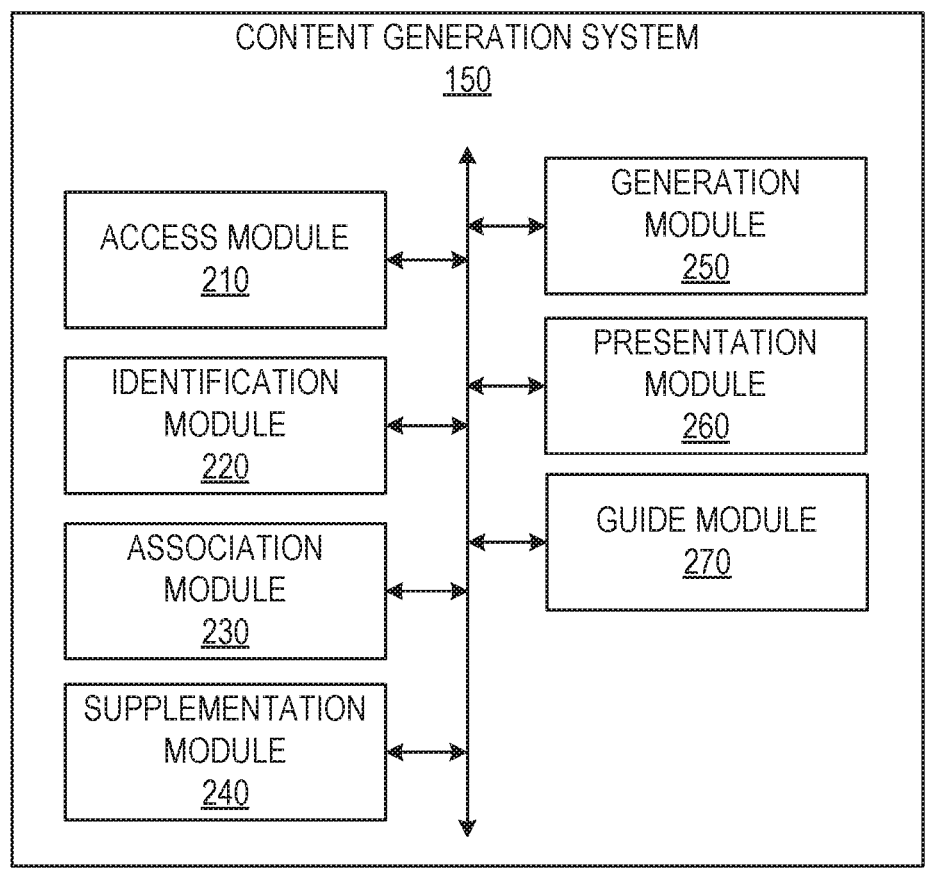
FIG. 2 is a block diagram of an example content generation system, according to various embodiments.

FIG. 2 is a block diagram illustrating components of the content generation system 150, according to some example embodiments. The content generation system 150 is shown as including an access module 210, an identification module 220, an association module 230, a supplementation module 240, a generation module 250, a presentation module 260, and a guide module 270 all configured to communicate with one another (e.g., via a bus, shared memory, or a switch). Any one or more of the components described herein may be implemented using hardware (e.g., one or more processors of a machine) or a combination of hardware and software. For example, any module or component described herein may configure a processor (e.g., among one or more processors of a machine) to perform operations for which that component is designed. Moreover, any two or more of these components may be combined into a single component, and the functions described herein for a single component may be subdivided among multiple components. Furthermore, according to various example embodiments, components described herein as being implemented within a single machine, databases (e.g., database 126), or device (e.g., client device 110) may be distributed across multiple machines, databases, or devices.

The access module 210 receives or accesses queries entered or made available on one or more of the client device 110, the web server 122, the database servers 124, the third-party servers 130, and the publication systems 142. In some embodiments, the access module 210 accesses queries or sets of queries periodically, on a rolling basis, or on demand. Once queries are accessed or received by the access module 210, one or more of the methods and operations described herein may be automatically performed in response to content within the queries or set of queries.

The identification module 220 identifies results (e.g., sets of publications) within databases (e.g., database 126) or servers (e.g., the database servers 124, the publication systems 142, or the third-party servers 130). In some embodiments, the identification module 220 identifies frequencies of presentations of publications within the set of publications. The identification module 220 may identify related keywords, user selections of publications, user selections of subsequent publications, and other user actions.

The association module 230 generates associations between sets of keywords, identifications, and titles of sets of publications. In some embodiments, the association module 230 generates associations between each keyword of a set of keywords and one or more publications. The association module 230 may map sets of keywords and identifications of sets of publications with sets of categories of the set of publications. In some embodiments, the association module 230 generates associations among keywords based on user activity.

The supplementation module 240 identifies a second set of keywords based on a first set of keywords. In some embodiments, the supplementation module 240 identifies the second set of keywords by transmitting the first set of keywords to a database and receives a set of related keywords from the database of the third-party server 130. In some instances, the supplementation module 240 performs operations to identify characteristics of sets of keywords. The supplementation module 240 may identify a rank of keywords within the database of the third-party server 130. In some embodiments, the supplementation module 240 identifies periods of interest associated with keywords.

The generation module 250 generates user interfaces with a plurality of user interface elements. The user interface elements may represent characteristics of sets of keywords or associations of keywords and publications. In some embodiments, the user interfaces and user interface elements also provide information on categories, retail moments, and products. The presentation module 260 causes presentation of the user interface, results responsive to selection of content generation icons, and guide pages.

The guide module 270 identifies gaps in content by analyzing queries to the third-party servers 130 and the publication system 142. The gaps may be identified by keywords being associated with a result in the third-party server 130 with no corresponding result on the publication system 142. In some embodiments, the guide module 270 generates suggestions of guides and collections to fill the identified gaps. The guide module 270 may also generate templates into which content may be entered for guide publications satisfying a gap.

Figure 3:
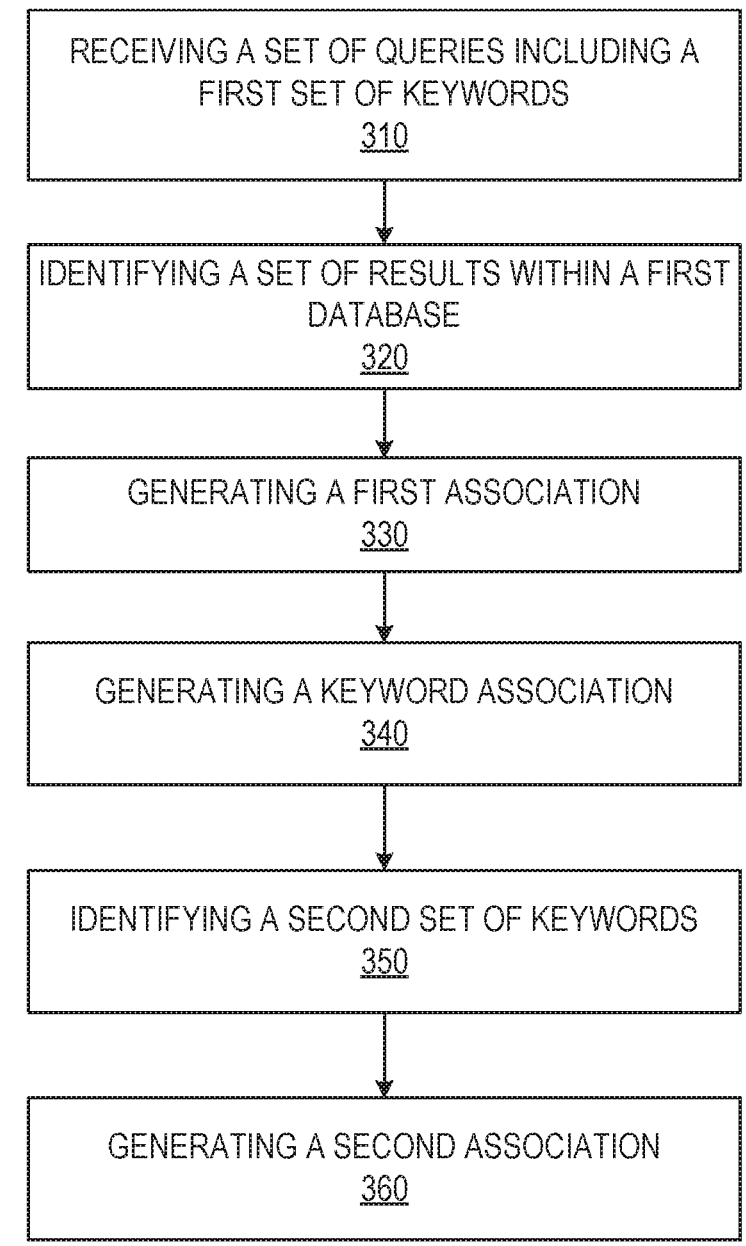
FIG. 3 is a flow chart illustrating an example method of identifying context and content drivers for use in generating content, according to various embodiments.

FIG. 3 is a flow chart of operations of the content generation system 150 in performing a method 300 of generating associations of keywords and publications (e.g., web pages provisioned by a server) for use in assisted or automated content generation, according to some example embodiments. Operations in the method 300 may be performed by the content generation system 150, using components described above with respect to FIG. 2.

In operation 310 the access module 210 receives or otherwise accesses a set of queries. The set of queries may initially be received by the publication system 142 as a user action searching publications of the publication system 142. The set of queries may comprise a first set of keywords. In some embodiments, the set of queries is a historical set of queries received by one or more of the networked system 102 and the publication system 142. In some instances, the set of queries is a set of queries being accessed by the access module 210 periodically or on a rolling basis from the publication system 142, such that once the set of queries is received by the access module 210, the content generation system 150 may perform the method 300 on the set of queries. The access module 210 may mine existing publication titles (e.g., guides, item listings, or products) to identify patterns related to research topics. Some of the patterns include "How to," "Top 10," "What is," and "a vs. b" topics. These topics may be included in the keywords forming the set of queries.

In operation 320, the identification module 220 identifies a set of results within a first database (e.g., the database 126) associated with the content generation system 150. In some embodiments, the set of results comprise a set of publications of the publication system 142. Each publication of the set of publications may include a title and an identification. In some instances, the title is a human- or machine-generated set of alphanumeric characters used for identification of the publication by one or more users of the publication system 142 or the content generation system 150. In some embodiments, the identification is a set of machine-generated alphanumeric characters to identify one or more of the publication and a listing or item associated with the publication. The title and identification may be distinct from one another. For example, the title may be a user-generated title and the identification may be an item identification number generated by the publication system 142 for identification of one or more items associated with each publication within the publication system 142. In some instances, a plurality of identifications may be associated with a single publication. The single publication may represent a listing for a plurality of items with each item having a distinct identification of the plurality of identifications.

In operation 330 the association module 230 generates a first association between the first set of keywords and identification and titles of the set of publications. In some embodiments, the association module 230 generates the first association between each keyword of the first set of keywords and one or more publications of the set of publications. Where an association is established between a specified keyword and a specified publication, the association may indicate the keyword as being associated with a title and one or more identifications of the specified publication. In some instances, the first association is generated as a graph, an array, or any other suitable data structure capable of establishing a set of links between keywords and publications or titles and identifications of publications. The first association may be stored within the first database (e.g., the database 126) associated with the publication system 142.

The first association may be a large-scale bi-partite graph of keywords to inventory by mining behavioral data to identify the items clicked by a user following a keyword search on the publication system 142. The keywords may then be used to seed queries, crawl third-party servers 130 (e.g., search engines and ad word systems) to capture neighborhood eCommerce intents. This gives a large vocabulary of internal and external eCommerce intents. The graphs may be iterated in different ways to classify the vocabulary into different classes which pivot on research or head queries, categories, products, events, and user intents.

Where the first association is generated as an array in the first database, the array may map the set of keywords to the identifications and titles of the set of publications. The association module 230 may also map one or more of the set of keywords and the identifications of the set of publications with a set of categories of the set of publications. In these embodiments, the array may include keywords, identifications, titles, and categories, and provide associations or interrelations among the keywords, identifications, titles, and categories.

In some embodiments, in generating the first association, the identification module 220 identifies a frequency of presentation of one or more publications of the set of publications. The identification module 220 may identify a frequency of use for one or more keywords of the first set of keywords within the database 126 or the publication system 142, the frequency of use for the one or more keywords indicating a number of times the one or more keywords is used in a search query resulting in presentation of the one or more publications. The identification module 220 may also identify one or more related keywords among the first set of keywords. Keywords may be identified as related keywords where two or more keywords, when used in a search query to the publication system 142, cause the publication system 142 to return the same publication as a result. The identification module 220 may also identify user selections of publications in response to the publications being provisioned as part of a set of results responding to a query containing the one or more keywords. In some embodiments, the identification module 220 identifies subsequent user selections of a subsequent publication after the initial selection of a publication of the set of results. In this way, the identification module 220 determines user actions of selecting publications based on entering keywords in the search (e.g., identifying publications directly related to the keywords) and user actions of subsequent selections of publications (e.g., identifying tangentially related or partially related publications). The first association may be generated between keywords and the identifications and titles of the publications which are returned as results in the publication system 142. In some embodiments, the association includes the frequency of use data for the one or more keywords and the one or more publications identified by the identification module 220.

In operation 340 the association module 230 generates a keyword association among keywords of the first set of keywords based on user activity. In some embodiments, the keyword association is stored within the first association. The keyword association may link two or more keywords based on a common link to one or more of a publication, a title of a publication, or an identification of a publication. In some embodiments, a keyword association may be formed between two given keywords where the two given keywords are each linked to a third keyword.

In some embodiments, the keyword association is based on user activities. One or more of the publication system 142 and the content generation system 150 identifies user activity in the form of input into the publication system 142 or the content generation system 150. The publication system 142 receives user input in the form of a search query having one or more keywords of the first set of keywords. The publication system 142 may generate a set of results comprising one or more publications of the set of publications. The publication system 142 may then transmit the set of results to the client device 110 from which the search query was received. In some embodiments, the publication system 142 may receive one or more user selections (e.g., user activity) of one or more results from the client device 110. The publication system 142 transmits data indicative of the one or more user selections to the content generation system 150. The association module 230 determines the one or more publications selected among the one or more user selections and the one or more keywords of the search query. The association module 230 may then link the two or more of the keywords in the keyword association based on the two or more keywords appearing in a common search query, causing the publication system 142 to retrieve a common set of results, and the one or more user selections.

In some embodiments, the operations 310-340 may be performed by the content generation system 150 during operation of the publication system 142 such that the content generation system 150 receives sets of queries, keywords, and sets of publications identified as results of the set of queries as the sets of queries and keywords are received by the publication system 142. In these embodiments, the operations 310-340 are repeated to aggregate a plurality of sets of queries received by the publication system 142 and a plurality of sets of results identified for the plurality of sets of queries. The association module 230, in these instances, generates an aggregate association among sets of keywords of the plurality of sets of queries and a plurality of identifications and a plurality of titles of a plurality of sets of publications of the plurality of sets of results. As such, the content generation system 150 may continually update the sets of keywords, sets of publications, and the resulting associations.

In operation 350, the supplementation module 240 identifies a second set of keywords based on the first set of keywords. The supplementation module 240 may identify the second set of keywords by transmitting the first set of keywords to a second database, such as a database associated with the third-party server 130. In response to transmission of the first set of keywords, the supplementation module 240 may receive a set of related keywords from the second database. The set of related keywords may be identified as the second set of keywords. In some embodiments, the set of related keywords are identified by the second server as keywords within a neighborhood of keywords or keywords previously identified by the third-party server 130 as being related to one or more keywords of the first set of keywords. For example, the supplementation module 240 may submit individual keywords or batches of related keywords to the third-party server 130, which returns a set of related words in the form of suggested search terms, related words, related topics, or any other suitable additional words.

An example process flow for identifying the second set of keywords is shown below in Diagram 1.

In some embodiments, upon identifying the second set of keywords, the supplementation module 240 performs one or more operations to identify characteristics of the first set of keywords and the second set of keywords within the second database. In some instances, the supplementation module 240 identifies a rank of one or more keywords of the first set of keywords and the second set of keywords within the second database. The rank may be a rank of one or more publications of the set of publications associated with one or more of the keywords of the first set of keywords and the second set of keywords being provided to the second database of the third-party server 130. For example, the rank may be a page ranking of a publication in response to the third-party server 130, acting as a search engine, receiving one or more keywords associated with the publication.

The supplementation module 240 may identify a frequency of use of one or more keywords of the first set of

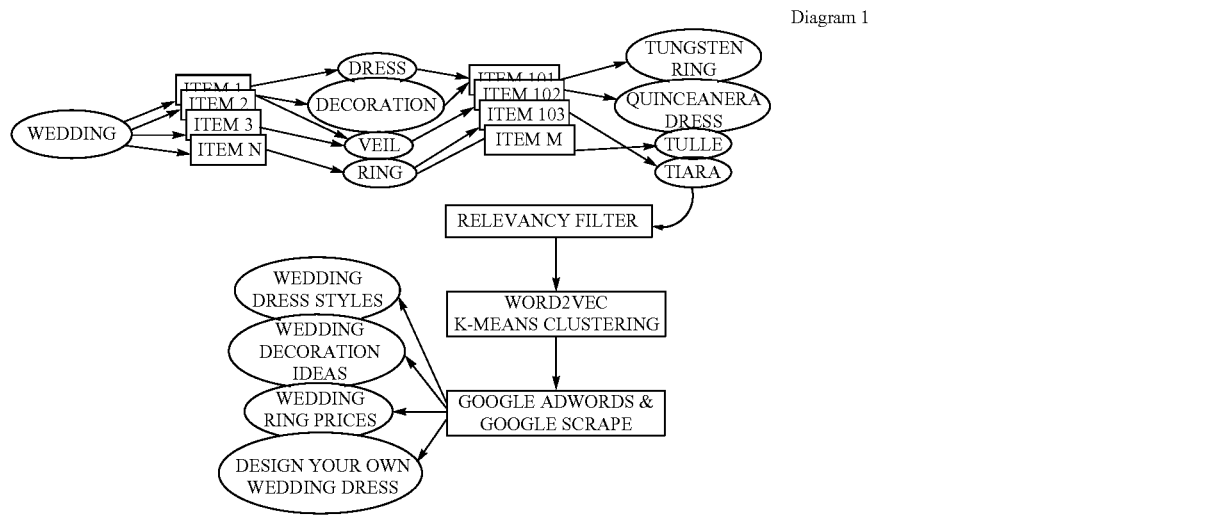

Diagram 1

As shown in Diagram 1, receiving a query including a first set of keywords including wedding may identify a set of items (e.g., Item 1, Item 2, Item 3, . . . , and Item N). The supplementation component 240 identifies one or more additional keywords (e.g., dress, decoration, veil, ring) associated with the set of items or contained in the set of items. The supplementation component 240 may then identify an additional set of items (e.g., Item 101, Item 102, Item 103, . . . , and Item M) associated with the set of additional keywords. In some instances, the supplementation component 240, in identifying the additional set of items, may perform one or more additional iterations for identifying additional keywords. The Supplementation component 240, upon identifying one or more sets of additional keywords, may apply a relevancy filter to the one or more sets of additional keywords. The relevancy filter may eliminate one or more of the additional keywords based on a semantic relation (e.g., a semantic similarity, a semantic distance, or a synonym/antonym relationship comparing an additional keyword to keywords of the query). The relevancy filter may pass the additional keywords, suitable filtered, to a k-means clustering component, determining one or more clusters, associations, or interrelations among the additional keywords. In some embodiments, the supplementation component 240 passes the clustered and relevant additional keywords to the second database (e.g., google adwords or google scrape) to receive additional keywords from the third party server 130.

keywords and the second set of keywords within the second database. In some embodiments, the supplementation module 240 identifies the frequency of use based on a query of the third-party server 130. Frequency of use may be understood as a number of times the third-party server 130 has received the one or more keywords in queries, a number of times receiving the one or more keywords in queries within a predetermined period of time, or an average number of times receiving the one or more keywords in queries given a set of predetermined time periods.

The supplementation module 240 may identify one or more periods of interest (e.g., a time period of interest) associated with one or more keywords of the first set of keywords and the second set of keywords. The one or more periods of interest may be seasons, holidays, a set of days or weeks leading up to an event, or any other suitable period of time. The period of interest may be associated with the one or more keywords based on a link or association between the keyword and a specified event, date, holiday, or the like.

In operation 360, the association module 230 associates the second set of keywords with the first set of keywords within the first database (e.g., the database 126). The operation 360 may be performed similarly or the same as the operations 330 or 340, described above. In some embodiments, the association module 230 may cluster and rank one or more of keywords or associations. In clustering, the association module 230 generates a vocabulary which may have a long tail of keywords. Word2Vec may be used to map keywords to their vector space. The keywords may be clustered using k-means. The keywords may be ranked using the bipartite graph and a generated relevancy score. The relevancy score may be generated as a number of page views multiplied by a recall of the keyword in context of a specified topic divided by a recall of the keyword overall. For each keyword, features like recall, current ranking, and other values may be calculated by crawling the third-party server 130 or incorporation of a third-party ranking system. In some embodiments, the relevancy score is generated based on a number of publications and user interactions. In such embodiments, the relevancy score may be generated based on a number of publications having user interactions or associated with user interactions, where the user interactions occur subsequent to the search query. The user interactions may be understood as page views, in some instances. In some embodiments, the relevancy score is generated based on a number of publications having user interactions subsequent to the search query and a number of publications having the keyword in a title of the publication.

Figure 4:
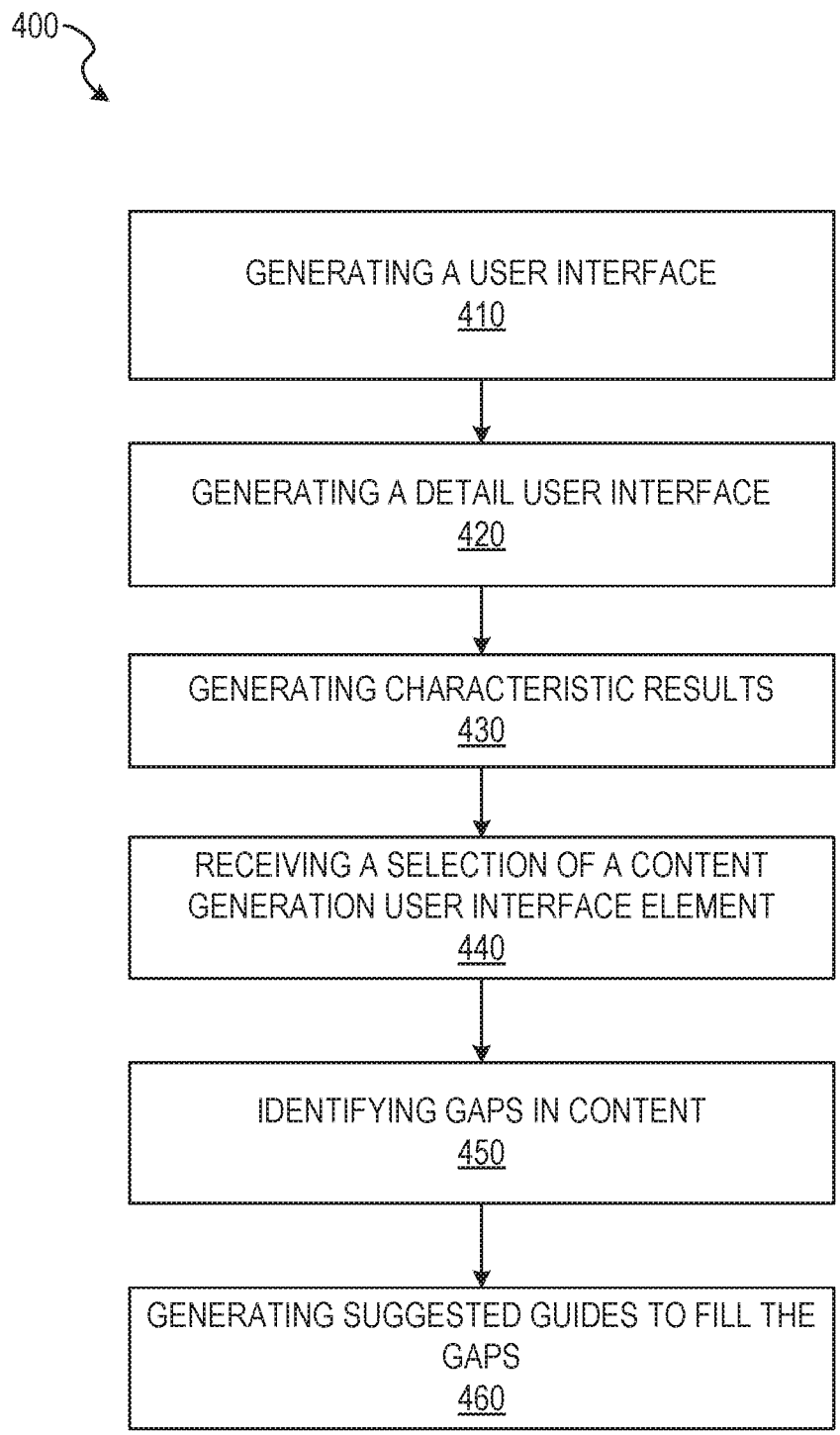
FIG. 4 is a flow chart illustrating an example method for generating content, according to various embodiments.

FIG. 4 is a flow chart of operations of the content generation system 150 in performing operations of a method 400 of generating a user interface for generating content for publication based on search engine optimization, according to various example embodiments. The operations depicted in FIG. 4 may be performed by the content generation system 150, using components described above with respect to FIG. 2.

In operation 410, the generation module 250 generates a user interface having a plurality of user interface elements. In some embodiments, each user interface element may represent a characteristic of the one or more characteristics of the first set of keywords, the second set of keywords, or associations of keywords and publications. In some embodiments, the plurality of user interface elements represent distinct aspects of the keywords or the associations of keywords and publications. For example, as shown in FIGS. 5-9, the user interface elements may provide information relating to one or more of categories, retail moments (e.g., periods of interest), and products (e.g., publications).

Figure 5:
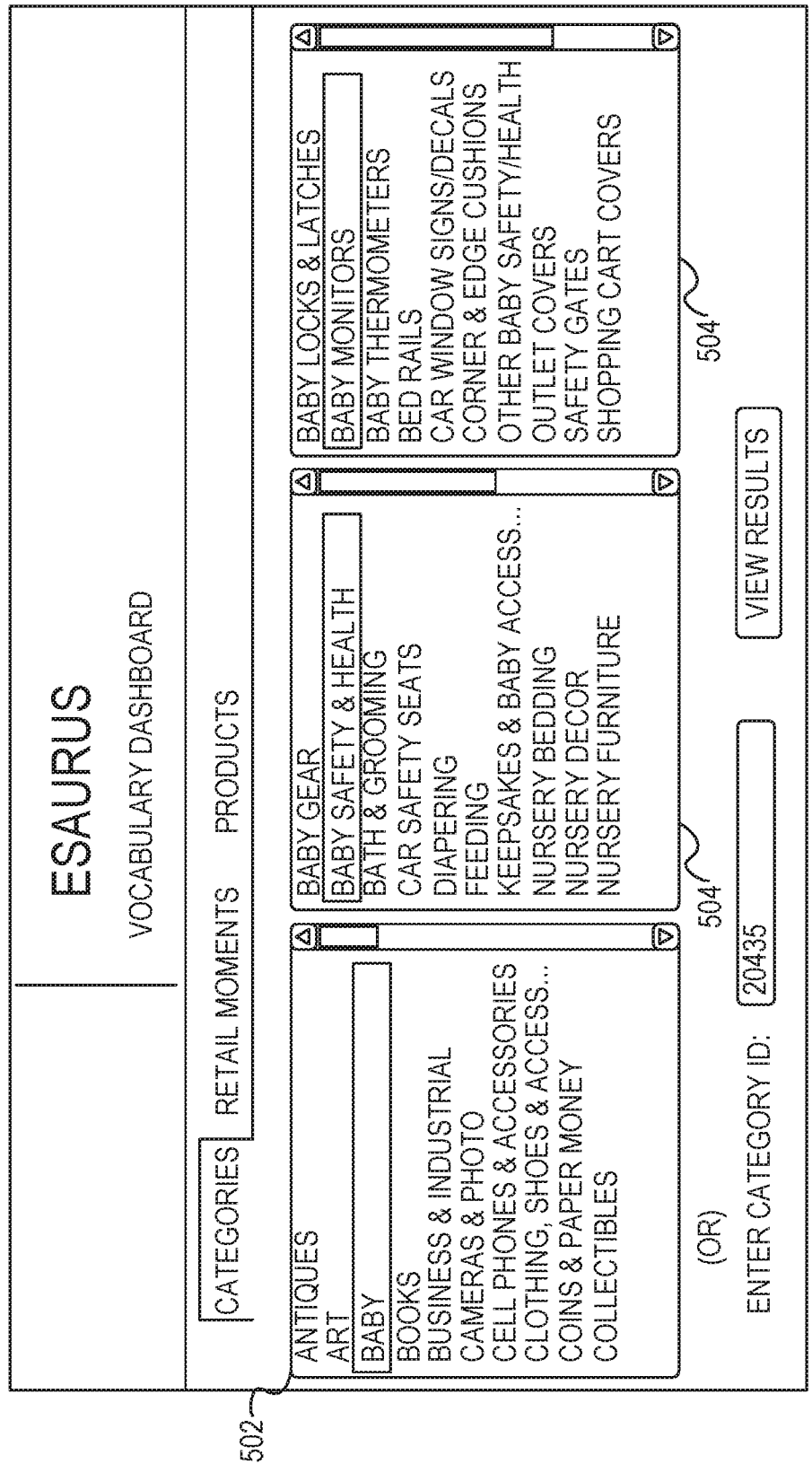
FIG. 5 is an example interface diagram illustrating a user interface screen of a content generation system, according to various embodiments.
Figure 7:
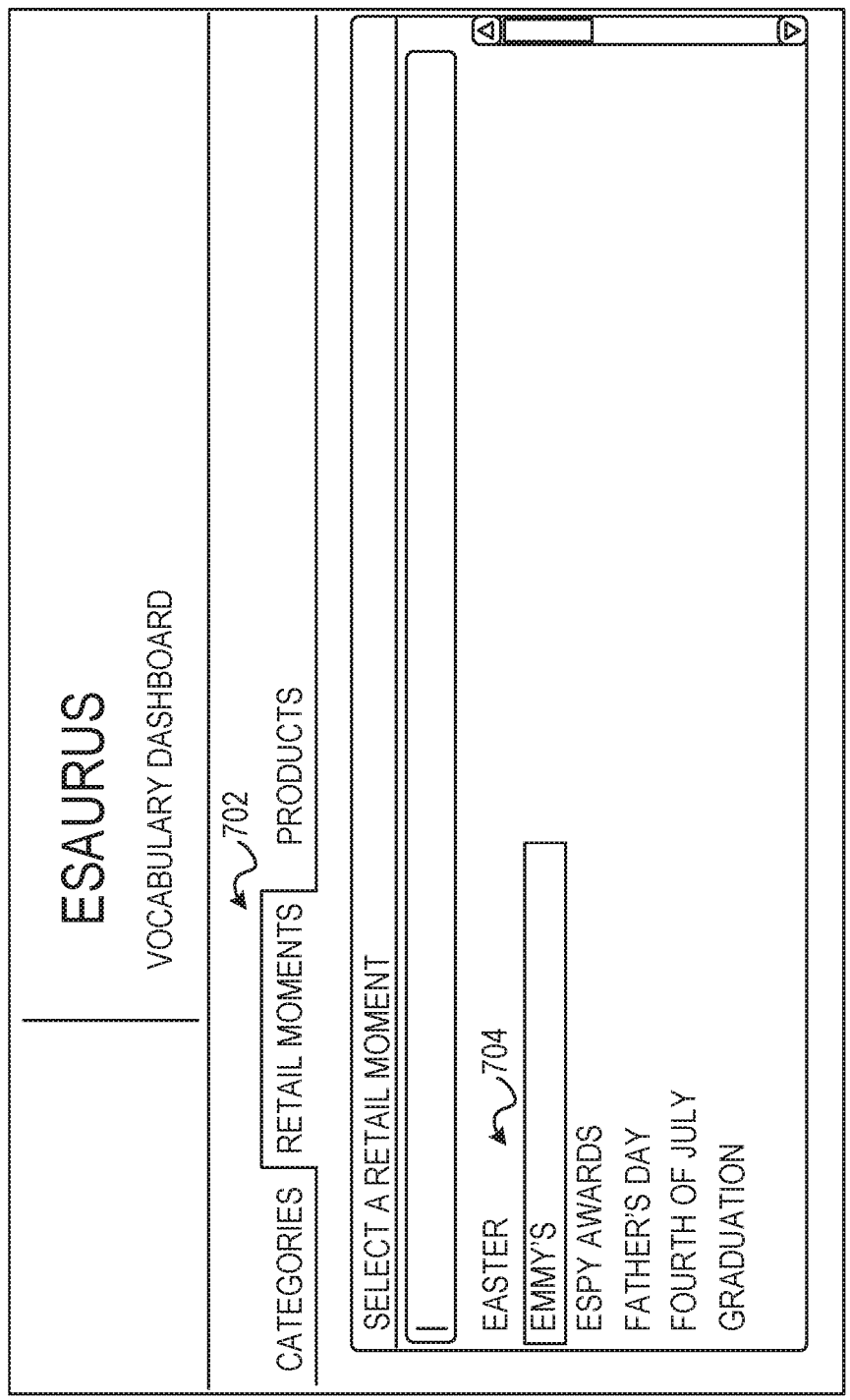
FIG. 7 is an example interface diagram illustrating a user interface screen of a content generation system, according to various embodiments.
Figure 9:
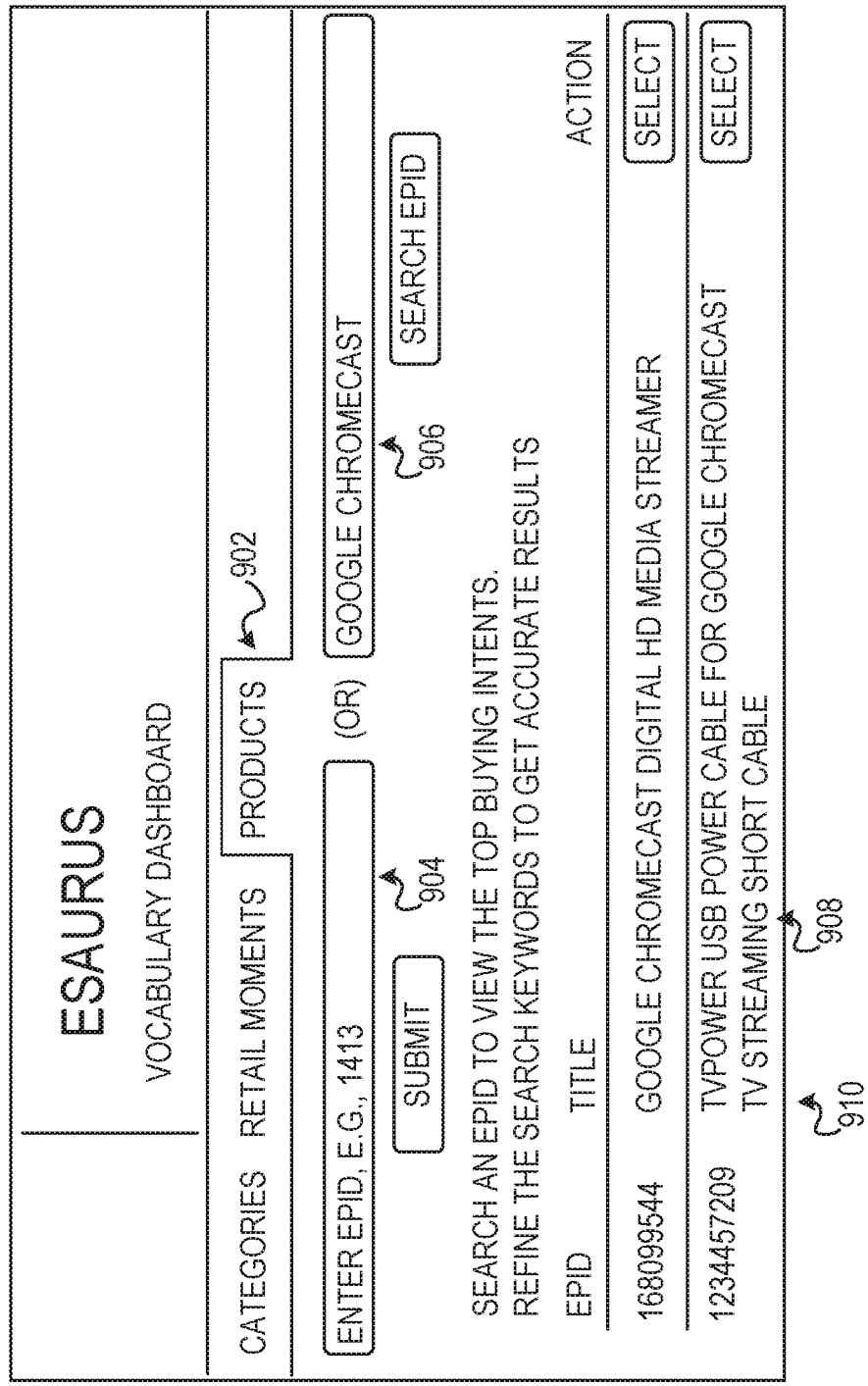
FIG. 9 is an example interface diagram illustrating a user interface screen of a content generation system, according to various embodiments.

In operation 420, in response to selection of a user interface element of the plurality of user interface elements, the generation module 250 generates a detail user interface. The detail user interface may present information relating to the characteristic (e.g., a characteristic of a keyword, a publication, or an association of keywords and publications) reflected by the selected user interface element. For example as shown in FIGS. 5 and 6, the categories user interface element is among the plurality of user interface elements. Upon selection of the categories user interface element, the generation module 250 generates the detail user interface to depict one or more additional user interface elements capable of designating one or more categories from a set of category options. As shown in FIGS. 7 and 8, the retail moments user interface element is one of the plurality of user interface elements and may indicate characteristics of keywords or publications relating to periods of interest. For example, as shown in FIG. 7, the retail moments user interface element provides options for holidays and events which are related to searches, publications, and products of the publication system 142. As shown in FIG. 9, the products user interface element is one of the plurality of user interface elements and may indicate characteristics of publications and keywords.

In some embodiments, each of the user interface elements acts as a portion of a tool providing differing ways of finding desired or theoretically optimized vocabulary. The category user interface element may provide a pivot enabling a user to create a browse page for a category. The category user interface element provides an option to drill down to a lowest level category within a category hierarchy or other category relation methodology. The retail moment user interface element provides a pivot enabling a user to create an RPP page to cater retail moments or events, such as Easter, July $4^{th}$, and other periods of interest and identify relevant vocabulary. The retail moment user interface element, once selected and provided an input, may provide top intents and top categories relevant to the event, holiday, or other period of interest. The product user interface element enables a user writing content for a RPP page to identify products or publications by identification, title, or a keyword search.

In operation 430, in response to receiving one or more selections of one or more characteristic representations within the detail user interface, the generation module 250 generates characteristic results. The results may help identify gaps between user interest in a publication of the publication system 142 with respect to external networked systems, such as the third-party server 130. The results may additionally suggest topics for creation of additional publications, such as product page publications or publications enhancing demand or exposure for other publications. In some embodiments, the results may enable content writers to find relevant vocabulary or knowledge for topics for on-page content optimization.

As shown in FIGS. 5 and 6, selection of a category user interface element 502 and selection of one or more characteristics 504 (e.g., category options), as depicted in FIG. 5, provides results including top buying intents 602, keywords 604 for the top buying intents 602, publishing system recall 606, third-party server demand 608, current ranking 610 of category terms on the third-party server 130, a ranking 612 of a publication page on the third-party server 130, top aspects (e.g., top attributes 614), and related ideas (e.g., related searches 616), as shown in FIG. 6. The top buying intents 602 may help identify which topics are of interest to users of the publication system 142 in the identified categories by indicating search terms (e.g., the keywords 604) used by users to research topics and retrieve associated content pages. The publication system recall indicates the searches associated with or for the identified categories on the publication system 142. The third-party server demand indicates a highest rank provided by the third-party server 130 for the category or keywords relating to the identified categories. The current ranking of terms on the third-party server 130 provides an indication of popularity or frequency of searches for the identified categories. In some embodiments, the results may provide a purchase count 618 (e.g., a number of products purchased within the identified categories), and product aspects 620 (e.g., brand names, regions of manufacture, and product names).

In some embodiments, the generation module 250 or the identification module 220 uses the bipartite graph to map items to leaf categories. Keywords 604 and aspects 620 may be rolled up (e.g., included, assigned, or presented) to different category levels in a hierarchical category structure to identify the most interesting keywords and attributes (e.g., keywords or attributes having a relatively higher predictive value for user interaction) for each category. Using these keywords 604 as seeds, the identification module 220 may crawl (e.g., parse or search) the third-party server 130 or other search engines to understand (e.g., identify, score, or generate associations between) vocabulary in that category.

As shown in FIGS. 7 and 8, selection of the retail moments user interface element 702 and selection or input of one or more periods of interest 704 (e.g., events, holidays, or time periods) provides top intents (e.g., keywords) and top categories relevant to the selected period of interest, as shown in FIG. 8, for example. The recall element may identify a set of publications by matching user intent (e.g., keywords) with item titles. Using the bi-partite graph generated in the method 300, the generation module 250 or the identification module 220 may find keywords 802 mapped to these publications, as shown in FIG. 8. The process may then be repeated by iterating over the graph N times to uncover broader vocabulary. Using the keywords 802 resulting from the search of the graph as seeds, the identification module 220 may crawl the third-party server 130 and related search systems to find external eCommerce intents. Using the graph, the identification module 220 may also map keywords 802 to categories to identify which categories are most popular for any topic, shown by the view count 804. This provides a comprehensive set of internal and external vocabulary for any topic.

As shown in FIG. 9, selection of the products user interface element 902 and selection of a product identification 904, product name 906, or product title 908 provides top intents, identification (e.g., a product identification number) for the publication, and publication title. In some embodiments, the generation module 250 provides product description 910 selected from the publication by the identification module 220.

In operation 440, the access module 210 receives selection of a content generation icon in response to the generation module 250 generating results presented by the presentation module 260. The selection of the content generation icon may be received through user interaction with the user interface generated by the generation module 250.

In operation 450, the guide module 270 identifies gaps in content within the publication system 142. The guide module 270 identifies the gaps by analyzing queries to the third-party server 130 and the publication system 142. The guide module 270 identifies one or more keywords having a result provided by the third-party server 130 which has no corresponding result on the publication system 142.

In operation 460, in response to identifying a lack of result, the guide module 270 generates suggestions of guides and collections to fill the identified gaps. In some embodiments, the suggested guides may be a buying guide (e.g., "how to find a ring size" or "how to clean silver jewelry") and a selling guide (e.g., "how much is 14k gold ring worth" or "where to sell my jewelry"). In some instances, in addition to generating suggestions (e.g., titles of guide pages or highlighting keywords associated with identified gaps), the guide module 270 may cause presentation of a guide generation page providing a template into which content may be entered to generate a guide publication satisfying an identified gap.

In response to opening an existing publication, the guide module 270 may parse language and values within the publication and identify or highlight vocabulary within the publication which may be modified to increase rankings on the publication system 142 and the third-party server 130. For example, the guide module 270 may identify synonyms for keywords which occur in the existing publication. The synonyms may be keywords which have a higher rank within the third-party server 130 or the publication system 142 than the keywords in the existing publication. In some instances, the synonyms are presented which have a rank above a predetermined threshold or have a rank a predetermined distance above the keyword of the existing publication.

In some embodiments, as an alternative to presenting synonyms or in addition to presenting synonyms, the guide module 270 may add one or more synonyms to page metadata of the existing publication. The metadata modified by the guide module 270 may be any metadata used in search engine optimization techniques, such as left navigation components, titles/headers, text blurbs, and page descriptions. The guide module 270 may also identify the synonyms for use in advertising campaigns, paid search campaigns, or other methods of increasing page views of the existing publication through the publication system 142 or the third-party server 130.

In some embodiments, the guide module 270 enables creation of product pages to support long living URLs acting as a collection of items. In these instances, using the bipartite graph, the identification module 220 maps the items to identifications of product publications. Keywords and aspects are rolled up into different identifications to find the most interesting keywords and attributes for each identification. Using these keywords as seeds, the identification module 220 crawls the third-party server 130 or other search engines to understand how external users research about a product.

As described above with respect to FIGS. 3 and 4 and Diagram 1, in some embodiments, the content generation system 150 identifies gaps in a set of publications. As described above in relation to FIGS. 2, 3, and 4, a user or one or more components of the content generation system 150 may identify gaps in the manner shown in Diagram 1. In such embodiments, a first keyword or topic is identified, such as "Wedding" in Diagram 1. The content generation system 150, as described in operation 310 and FIGS. 2, 3, and 4, analyzes queries to the publication system 142 including the first keyword or topic. The content generation system 150 identifies a first set of results (e.g., publications or items) provided by the publication system 142 for the queries including the first keyword or topic, as in operation 320. As described above, with respect to FIGS. 3 and 4, in some instances the first keyword or topic (e.g., the first set of keywords) and the first set of results (e.g., the set of results of operation 320) may be related by the first association, described in operation 330. Such a first association may relate the keyword, "Wedding," with the first set of results, Item 1-Item N, as shown in Diagram 1. In some embodiments, the content generation system 150 may then identify subsequent keywords or topics used in queries to the publication system 142 for which one or more of the first set of results (e.g., Item 1-Item N) are provided. As shown in Diagram 1, the subsequent keywords or topics may include "Dress," "Decoration," "Veil," and "Ring." Further, the content generation system 150 identifies associations between the subsequent keywords or topics (e.g., Dress, Decoration, Veil, and Ring) and a second set of results, not included in the first set of results. Similarly, the content generation system 150 may identify additional subsequent keywords or topics, similar to the manner for identifying the subsequent keywords or topics initially identified.

In some embodiments, the first keyword, the subsequent keywords, and the additional subsequent keywords may be used by one or more of the guide module 270 and the supplementation module 240 as input keywords to identify gaps in content of the publication system 142. As described above with respect to operations 350, 430, and 450 and Diagram 1, in some embodiments, one or more of the supplementation module 240 and the guide module 270 identifies gaps in the content of the publication system 142 by passing the input keywords to a relevancy filter. The relevancy filter may filter the input keywords for relevancy, based on the relevancy score described in operation 360. In some embodiments, the supplementation module 240 or the guide module 270 passes the filtered input keywords, filtered by the relevancy filter, to the clustering component, shown in Diagram 1. In some instances, the clustering component, as described in operations 350 and 360, clusters the filtered input keywords to remove redundancies and provide clustered input keywords. As shown in Diagram 1 and described in operations 350 and 360, the clustered input keywords are used by the supplementation module 240 to search the second database (e.g., Google Ad Words & Google Scrape) to identify the second set of keywords, described in operation 350. For example, as shown in Diagram 1, the second set of keywords include "Wedding Dress Styles," "Wedding Decoration Ideas," "Wedding Ring Prices," and "Design Your Own Wedding Dress." The guide module 270 identifies one or more of the second set of keywords as gaps in the content of the publication system 142.

In some embodiments, the content generation system 150 has generated the first association and the second association. As described above, in operation 330, the first association is generated between the first set of keywords and the set of results in the first database. Further, as described in operation 360, the second association is generated between the second set of keywords and the first set of keywords. In such embodiments, as described above, the guide module 270 identifies the gaps as the second set of keywords based on the first association and the second association. As described above, with respect to FIG. 4, the guide module 270 identifies the gaps in response to receiving selections within the detail user interface, such as the interfaces described in FIG. 5. Once the gaps (e.g., the second set of keywords) have been identified and presented in the user interface, the guide module 270 may generate guides and collections (e.g., one or more suitable publications collected onto a single page or a list of suitable publications) to fill the gaps. In filling the gaps, a search on the second database, using one or more of the second keywords, provides a generated guide or collection as a result, served by the publication system 142. In some embodiments, the guide module 270 provides one or more of the gaps (e.g., the second set of keywords) and one or more suggestions to a user, such that the user may be guided in creating suitable guides or collections.

As described above with respect to methods 300 and 400, gaps may be found using categories, retail moments, or products as pivot points. For example, the categories may be represented by user interface elements in FIG. 5, while retail moments and products are represented with user interface elements in FIGS. 7 and 9, respectively. Selection of one or more categories, retail moments, or products may cause the content generation system 150 to surface and present the second set of keywords (e.g., gaps) in a user interface. The second set of keywords may be surfaced and presented in user interfaces, as shown in FIGS. 6, 8, and 9. For example, portions of the second set of keywords may be presented among the top buying intents 602, the top attributes 614, or the related searches 616, as shown in FIG. 6. By way of another example, portions of the second set of keywords may be presented among the keywords 802, as shown in FIG. 8.

According to various example embodiments, one or more of the methodologies described herein may facilitate identification of keyword and publication rankings as well as automatic or semi-automatic generation of publications (e.g., web pages included in the publication system 142) and generating a theoretically optimized page ranking or visibility for the existing publication. Methodologies for generating the content may automatically identify gaps within keyword inclusion in the publication system 142, identify opportunities for improvement within page rankings in the publication system 142 and the third-party server 130, modify existing publications, or generate new publications from scratch or based on preexisting templates. In particular, one or more of the methodologies described herein may constitute at least a portion of a method at least partially implemented by a machine that enables one or more users of a network-based system to view, interact with, and generate publications and provide for search engine optimization. Accordingly, one or more of the methodologies described herein may have the effect of allowing a user to navigate through the selling or purchase of items and increasing visibility of publication pages related to the items.

As a result, one or more of the methodologies described herein may obviate a need for certain efforts or resources that otherwise would be involved in research, decision-making, online shopping, and more. Efforts expended by a user in identifying a publication within a set of results may be reduced and more accurately determined based on the methodologies described herein. Efforts expended to optimize publications for presentation by search engines may be reduced or eliminated by one or more of the methodologies described herein. Computing resources used by one or more machines, databases, or devices (e.g., within the network environment 1000) may similarly be reduced. Examples of such computing resources include processor cycles, network traffic, memory usage, data storage capacity, power consumption, and cooling capacity. Specifically, computing resources used by machines, being directed by interactions of a user, to generate or modify existing or new content are reduced.

EXAMPLES

To better illustrate the apparatus and methods disclosed herein, a non-limiting list of examples is provided herein:

1. A method comprising receiving a set of queries, by one or more processors, the set of queries comprising a first set of keywords; identifying a set of results within a first database associated with the one or more processors, the set of results including a set of publications having an identification and a title; generating an association between the first set of keywords and identifications and the titles of the set of publications; generating a first association among keywords of the first set of keywords based on user activity received in response to identifying the set of results; identifying a second set of keywords based on the first set of keywords; and associating the second set of keywords with the first set of keywords within the first database.

2. The method of example 1, wherein generating the association further comprises generating an array within the first database, the array mapping the set of keywords to the identifications and titles of the set of publications; and mapping one or more of the set of keywords and the identifications of the set of publications with a set of categories of the set of publications.

3. The method of examples 1 or 2 further comprising aggregating a plurality of sets of queries received by the one or more processors and a plurality of sets of results identified for the plurality of sets of queries; and generating an aggregate association between sets of keywords of the plurality of sets of queries and a plurality of identifications and a plurality of titles of a plurality of sets of publications of the plurality of sets of results.

4. The method of any one or more of examples 1-3, wherein identifying the second set of keywords further comprises transmitting the first set of keywords to a second database; and receiving a set of related keywords from the second database, the set of related keywords being the second set of keywords.

5. The method of any one or more of examples 1-4, wherein identifying the second set of keywords further comprises identifying a rank of one or more keywords of the second set of keywords within the second database; identifying a frequency of use of one or more keywords of the second set of keywords within the second database; and identifying one or more periods of interest associated with one or more keywords of the second set of keywords within the second database.

6. The method of any one or more of examples 1-5, wherein generating the first association further comprises identifying a frequency of presentation of one or more publications of the set of publications; identifying a frequency of use for one or more keywords of the first set of keywords, the frequency of use indicating a number of times one or more keywords is used in a search query resulting in a publication of the set of publications; and identifying one or more related keywords among the first set of keywords.

7. The method of any one or more of examples 1-6 further comprising receiving one or more keyword in a search query; generating a set of publication results including one or more publications of the set of publications; determining a user selection of a publication of the set of publications after presentation of the set of publications within the set of publication results; determining a subsequent user selection of a subsequent publication of the set of publications after presentation of the set of publications; and associating the publication and the subsequent publication with the one or more keyword within the first association.

8. The method of any one or more of examples 1-7 further comprising generating a user interface having a plurality of user interface elements, the user interface elements causing presentation of one or more characteristics of the first association and the second association; and causing presentation of a keyword from the first association or the second association in place of a keyword received by the one or more processor.

9. The method of any one or more of examples 1-8 further comprising identifying a time period of interest from the first association and the second association, the time period of interest being associated with an event; identifying a publication associated with a first user and the time period of interest; and generating a posting prompt indicating the time period of interest, the event associated with the time period of interest, and the publication associated with the first user which is a subject of the posting.

10. The method of any one or more of examples 1-9 further comprising identifying a keyword within a search query, the keyword being one of the first set of keywords or the second set of keywords and the keyword being associated with a publication of the set of publications; and generating a relevancy score for the keyword with respect to the publication based on one or more user interactions with the publication subsequent to the search query.

11. The method of any one or more of examples 1-10 wherein the relevancy score is generated based on a number of publications having user interactions subsequent to the search query and a number of publications having the keyword in a title of the publication.

12. A system comprising one or more processors; and a machine-readable storage device coupled to the one or more processors, the machine-readable storage device comprising processor executable instructions that, when executed by the one or more processors, cause the one or more processors to perform operations comprising receiving a set of queries, by the one or more processors, the set of queries comprising a first set of keywords; identifying a set of results within a first database associated with the one or more processors, the set of results including a set of publications having an identification and a title; generating an association between the first set of keywords and identifications and the titles of the set of publications; generating first association among keywords of the first set of keywords based on user activity received in response to identifying the set of results; identifying a second set of keywords based on the first set of keywords; and associating the second set of keywords with the first set of keywords within the first database.

13. The system of example 12, wherein generating the association further comprises generating an array within the first database, the array mapping the set of keywords to the identifications and titles of the set of publications; and mapping one or more of the set of keywords and the identifications of the set of publications with a set of categories of the set of publications.

14. The system of examples 12 or 13, wherein identifying the second set of keywords further comprises transmitting the first set of keywords to a second database; receiving a set of related keywords from the second database, the set of related keywords being the second set of keywords; identifying a rank of one or more keywords of the second set of keywords within the second database; identifying a frequency of use of one or more keywords of the second set of keywords within the second database; and identifying one or more periods of interest associated with one or more keywords of the second set of keywords within the second database.

15. The system of any one of examples 12-14, wherein generating the first association further comprises identifying a frequency of presentation of one or more publications of the set of publications; identifying a frequency of use for one or more keywords of the first set of keywords, the frequency of use indicating a number of times one or more keywords is used in a search query resulting in a publication of the set of publications; and identifying one or more related keywords among the first set of keywords.

16. A machine-readable storage device comprising processor executable instructions that, when executed by one or more processors of a machine, cause the machine to perform operations comprising receiving a set of queries, by one or more processors, the set of queries comprising a first set of keywords; identifying a set of results within a first database associated with the one or more processors, the set of results including a set of publications having an identification and a title; generating an association between the first set of keywords and identifications and the titles of the set of publications; generating first association among keywords of the first set of keywords based on user activity received in response to identifying the set of results; identifying a second set of keywords based on the first set of keywords; and associating the second set of keywords with the first set of keywords within the first database.

17. The machine-readable storage device of example 16, wherein generating the association further comprises generating an array within the first database, the array mapping the set of keywords to the identifications and titles of the set of publications; and mapping one or more of the set of keywords and the identifications of the set of publications with a set of categories of the set of publications.

18. The machine-readable storage device of examples 16 or 17, wherein identifying the set of keywords further comprises transmitting the first set of keywords to a second database; receiving a set of related keywords from the second database, the set of related keywords being the second set of keywords; identifying a rank of one or more keywords of the second set of keywords within the second database; identifying a frequency of use of one or more keywords of the second set of keywords within the second database; and identifying one or more periods of interest associated with one or more keywords of the second set of keywords within the second database.

19. The machine-readable storage device of any one or more of examples 16-18 wherein generating the first association further comprises identifying a frequency of presentation of one or more publications of the set of publications; identifying a frequency of use for one or more keywords of the first set of keywords, the frequency of use indicating a number of times one or more keywords is used in a search query resulting in a publication of the set of publications; and identifying one or more related keywords among the first set of keywords.

20. The machine-readable storage device of any one or more of examples 16-19 wherein the operations further comprise receiving one or more keyword in a search query; generating a set of publication results including one or more publications of the set of publications; determining a user selection of a publication of the set of publications after presentation of the set of publications within the set of publication results; determining a subsequent user selection of a subsequent publication of the set of publications after presentation of the set of publications; and associating the publication and the subsequent publication with the one or more keyword within the first association.

21. A machine readable medium carrying processor executable instructions that, when executed by one or more processors of a machine, cause the machine to carry out the method of any one of examples 1 to 11.

These and other examples and features of the present apparatus and methods are set forth above in part in the Detailed Description. The Summary and the Examples are intended to provide non-limiting examples of the present subject matter. It is not intended to provide an exclusive or exhaustive explanation. The Detailed Description is included to provide further information about the present subject matter.

Modules, Components, and Logic

Certain embodiments are described herein as including logic or a number of components, modules, or mechanisms. Modules or components may constitute either software modules or components (e.g., code embodied on a machine-readable medium or machine-readable storage device) or hardware modules or components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Machine and Software Architecture

The components, methods, applications and so forth described in conjunction with FIGS. 2-9 are implemented in some embodiments in the context of a machine and an associated software architecture. In various embodiments, the components, methods, applications and so forth described above are implemented in the context of a plurality of machines, distributed across and communicating via a network, and one or more associated software architectures. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 10:
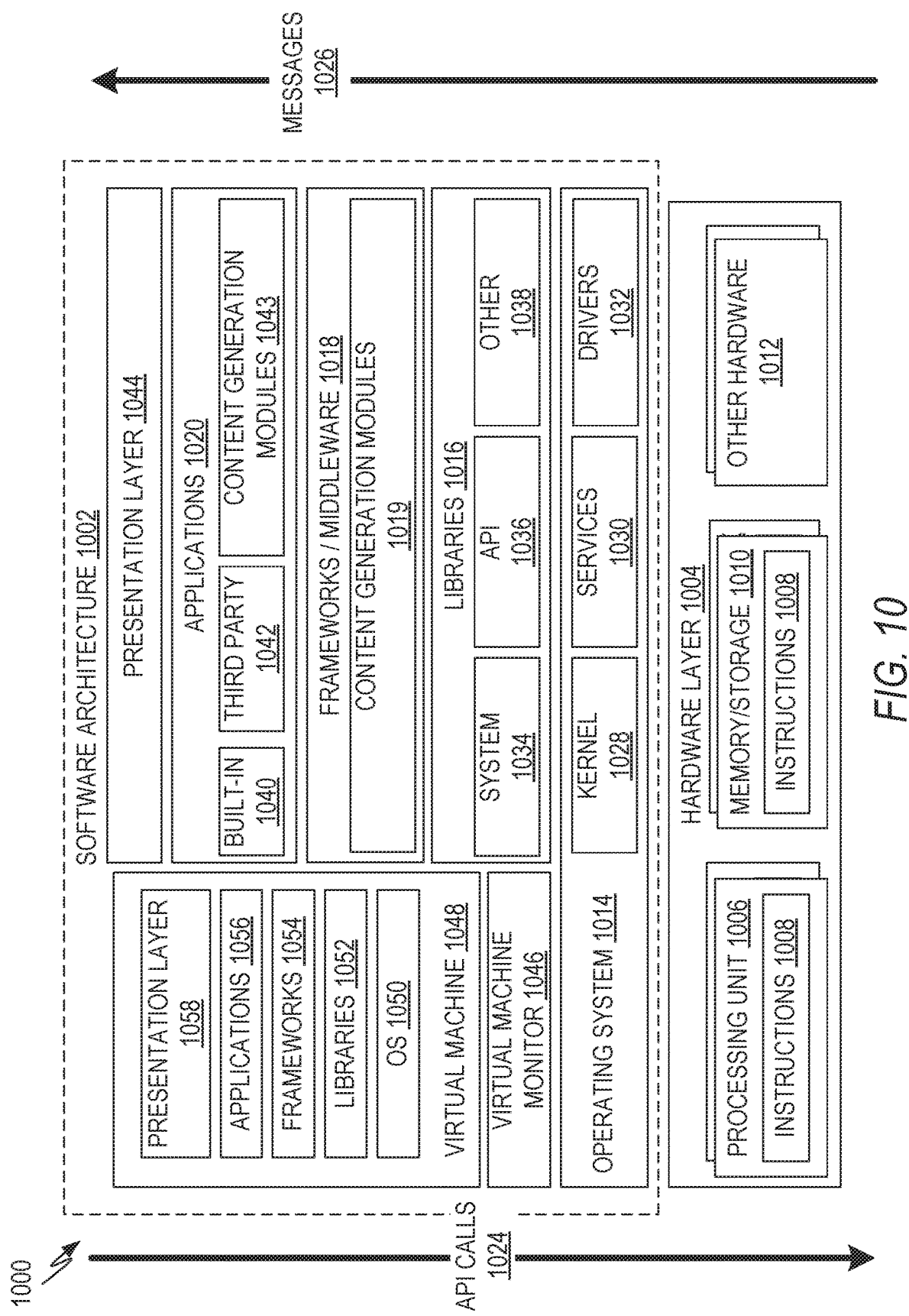
FIG. 10 is a block diagram illustrating an example of a software architecture that may be installed on a machine, according to some example embodiments.

FIG. 10 is a block diagram 1000 illustrating a representative software architecture 1002, which may be used in conjunction with various hardware architectures herein described. FIG. 10 is merely a non-limiting example of a software architecture and it will be appreciated that many other architectures may be implemented to facilitate the functionality described herein. The software architecture 1002 may be executing on hardware such as machine 1100 of FIG. 11 that includes, among other things, processors 1110, memory/storage 1130, and I/O components 1150. A representative hardware layer 1004 is illustrated and can represent, for example, the machine 1100 of FIG. 11. The representative hardware layer 1004 comprises one or more processing units 1006 having associated executable instructions 1008. Executable instructions 1008 represent the executable instructions of the software architecture 1002, including implementation of the methods, components and so forth of FIGS. 2-4. Hardware layer 1004 also includes memory and/or storage components 1010, which also have executable instructions 1008. Hardware layer 1004 may also comprise other hardware 1012, which represents any other hardware of the hardware layer 1004, such as the other hardware illustrated as part of machine 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020 and presentation layer 1044. Operationally, the applications 1020 and/or other components within the layers may invoke application programming interface (API) calls 1024 through the software stack and receive a response, returned values, and so forth illustrated as messages 1026 in response to the API calls 1024. The layers illustrated are representative in nature and not all software architectures have all layers. For example, some mobile or special purpose operating systems may not provide a frameworks/middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software components to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) may provide a higher-level common infrastructure that may be utilized by the applications 1020 and/or other software components/modules. For example, the frameworks 1018 may provide various graphic user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform. In some example embodiments content generation modules 1043 (e.g., one or more modules or components of the content generation system 150) may be implemented at least in part within the middleware/frameworks 1018. For example, in some instances at least a portion of the presentation module 260, providing graphic and non-graphic user interface functions, may be implemented in the middleware/frameworks 1018. Similarly, in some example embodiments, portions of one or more of the access module 210, the identification module 220, the association module 230, the supplementation module 240, the generation module 250, the presentation module 260, and the guide module 270 may be implemented in the middleware/frameworks 1018.

The applications 1020 include built-in applications 1040, third-party applications 1042, and/or content generation modules 1043 (e.g., user-facing portions of one or more of the modules or components of the content generation system 150). Examples of representative built-in applications 1040 may include, but are not limited to, a contacts application, a browser application, a book reader application, a location application, a media application, a messaging application, and/or a game application. Third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1042 may invoke the API calls 1024 provided by the mobile operating system such as operating system 1014 to facilitate functionality described herein. In various example embodiments, the user-facing portions of the content generation modules 1043 may include one or more components or portions of components described with respect to FIG. 2. For example, in some instances, portions of the access module 210, the identification module 220, the association module 230, the supplementation module 240, the generation module 250, the presentation module 260, and the guide module 270 associated with user interface elements (e.g., data entry and data output functions) may be implemented in the form of an application.

The applications 1020 may utilize built-in operating system functions (e.g., kernel 1028, services 1030 and/or drivers 1032), libraries (e.g., system libraries 1034, API libraries 1036, and other libraries 1038), frameworks/middleware 1018 to create user interfaces to interact with users of the system. Alternatively, or additionally, in some systems, interactions with a user may occur through a presentation layer, such as presentation layer 1044. In these systems, the application/component "logic" can be separated from the aspects of the application/component that interact with a user.

Some software architectures utilize virtual machines. In the example of FIG. 10, this is illustrated by virtual machine 1048. A virtual machine creates a software environment where applications/components can execute as if they were executing on a hardware machine (such as the machine 1100 of FIG. 11, for example). A virtual machine is hosted by a host operating system (operating system 1014 in FIG. 10) and typically, although not always, has a virtual machine monitor 1046, which manages the operation of the virtual machine 1048 as well as the interface with the host operating system (i.e., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Example Machine Architecture and Machine-Readable Medium

Figure 11:
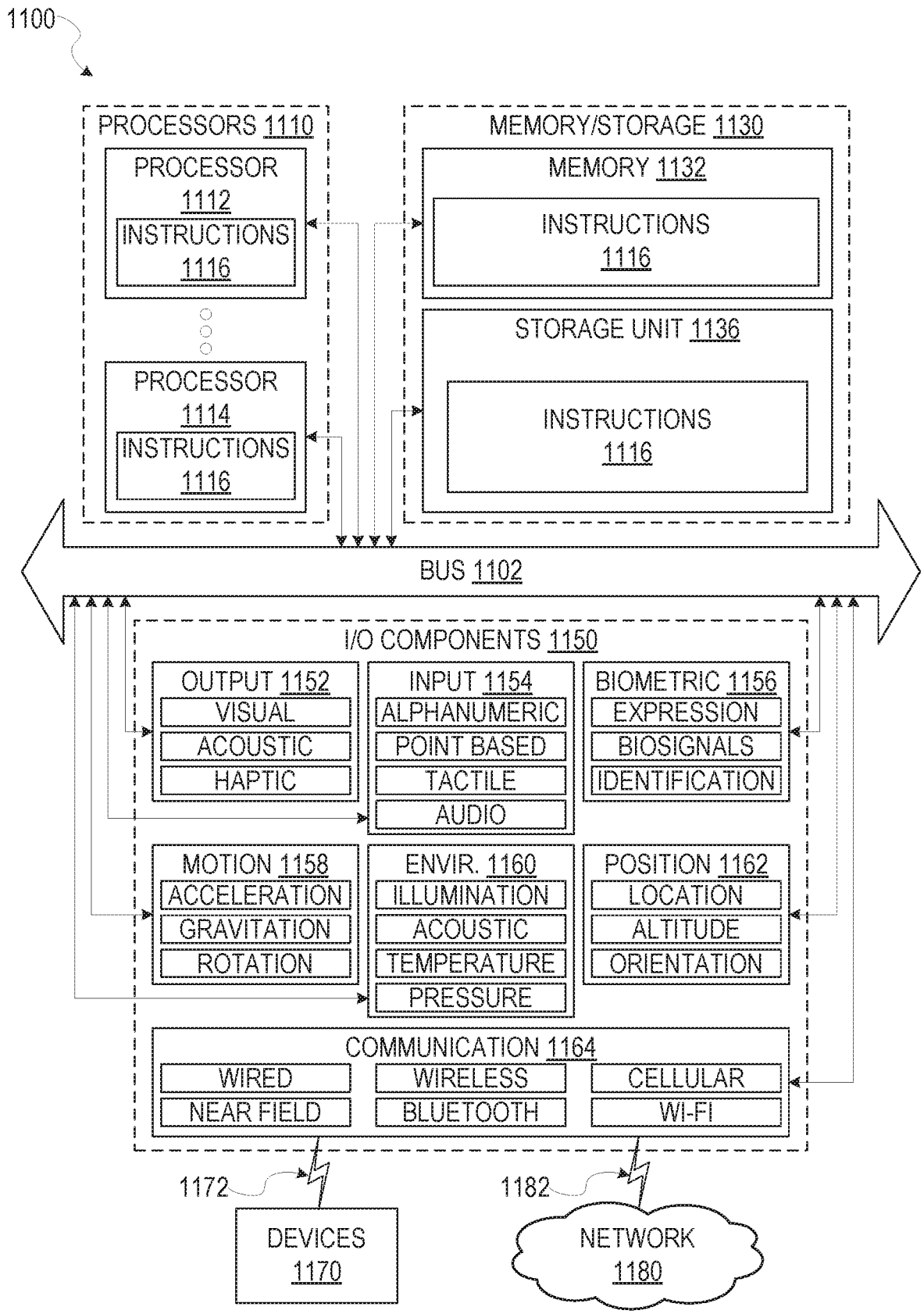
FIG. 11 illustrates a diagrammatic representation of a machine in the form of a computer system within which a set of instructions may be executed for causing the machine to perform any one or more of the methodologies discussed herein, according to an example embodiment.

FIG. 11 is a block diagram illustrating components of a machine 1100, according to some example embodiments, able to read instructions (e.g., processor executable instructions) from a machine-readable medium (e.g., a non-transitory machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example the instructions 1116 may cause the machine 1100 to execute the flow diagrams of FIGS. 3 and 4. Additionally, or alternatively, the instructions 1116 may implement the access module 210, the identification module 220, the association module 230, the supplementation module 240, the generation module 250, the presentation module 260, and the guide module 270 of FIGS. 2-4, and so forth. The instructions 1116 transform the general, non-programmed machine into a particular machine programmed to carry out the described and illustrated functions in the manner described.

In alternative embodiments, the machine 1100 operates as a standalone device or may be coupled (e.g., networked) to other machines in a networked system. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), an entertainment media system, a web appliance, a network router, a network switch, a network bridge, or any machine capable of executing the instructions 1116, sequentially or otherwise, that specify actions to be taken by machine 1100. In some example embodiments, in the networked deployment, one or more machines may implement at least a portion of the components described above. The one or more machines interacting with the machine 1100 may comprise, but not be limited to, a personal digital assistant (PDA), an entertainment media system, a cellular telephone, a smart phone, a mobile device, a wearable device (e.g., a smart watch), a smart home device (e.g., a smart appliance), and other smart devices. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory/storage 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1112 and processor 1114 that may execute instructions 1116. The term "processor" is intended to include a multi-core processor that may comprise two or more independent processors (sometimes referred to as "cores") that may execute instructions contemporaneously. Although FIG. 11 shows multiple processors 1110, the machine 1100 may include a single processor with a single core, a single processor with multiple cores (e.g., a multi-core process), multiple processors with a single core, multiple processors with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of processors 1110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing or carrying instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. A transitory carrier medium or transmission medium carrying machine-readable instruction is an embodiment of a machine readable medium.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172, respectively. For example, the communication components 1164 may include a network interface component or other suitable device to interface with the network 1180. In further examples, communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising: identifying, by one or more processors, a first set of keywords based on a set of queries submitted to a publication system to search a first database of the publication system;
identifying a set of publications within the first database;
generating associations among keywords from the first set of keywords and publications from the set of publications;
generating associations among keywords of the first set of keywords based on historical search results of publications from the first database returned in response to the set of queries;
identifying a second set of keywords based on the first set of keywords by submitting the first set of keywords to a third-party server having a second database and receiving the second set of keywords in response;
generating associations among keywords from the second set of keywords and keywords from the first set of keywords;
identifying one or more gaps in content in the first database of the publication system based on a comparison of results from the first database and the second database for one or more keywords; and
generating one or more user interfaces for generating and/or modifying content within the first database of the publication system based on: the associations among keywords from the first set of keywords and publications from the set of publications, the associations among keywords from the first set of keywords, the associations among keywords from the first set of keywords and keywords from the second set of keywords, and the one or more gaps in content in the first database of the publication system.

2. The method of claim 1, wherein generating the associations among keywords from the first set of keywords and publications from the set of publications further comprises:
generating an array within the first database, the array mapping the first set of keywords to the set of publications; and
mapping one or more of the first set of keywords and the set of publications with a set of categories of the set of publications.

3. The method of claim 1, wherein identifying the second set of keywords further comprises:
identifying a rank of one or more keywords of the second set of keywords within the second database;
identifying a frequency of use of one or more keywords of the second set of keywords within the second database; and
identifying one or more periods of interest associated with one or more keywords of the second set of keywords within the second database.

4. The method of claim 1, wherein generating the associations among keywords of the first set of keywords further comprises:
identifying a frequency of presentation of one or more publications of the set of publications;
identifying a frequency of use for one or more keywords of the first set of keywords, the frequency of use indicating a number of times one or more keywords is used in a search query resulting in a publication of the set of publications; and
identifying one or more related keywords among the first set of keywords.

5. The method of claim 1 further comprising:
receiving one or more keywords in a search query;
generating a set of publication results including one or more publications of the set of publications based on the one or more keywords in the search query;
determining a user selection of a publication of the set of publications after presentation of the set of publication results;
determining a subsequent user selection of a subsequent publication of the set of publications after presentation of the set of publication results; and
associating the publication and the subsequent publication with the one or more keywords within the associations among keywords from the first set of keywords and publications from the set of publications.

6. The method of claim 1, wherein the one or more user interfaces cause presentation of a keyword in place of a keyword received by the one or more processors based on the associations among keywords from the first set of keywords or the associations among keywords from the first set of keywords and keywords from the second set of keywords.

7. The method of claim 1 further comprising:
identifying a time period of interest associated with an event;
identifying a publication associated with a first user and the time period of interest; and
generating a posting prompt indicating the time period of interest, the event associated with the time period of interest, and the publication associated with the first user which is a subject of the posting.

8. The method of claim 1 further comprising:
identifying a keyword within a search query, the keyword being one of the first set of keywords or the second set of keywords and the keyword being associated with a publication of the set of publications; and
generating a relevancy score for the keyword with respect to the publication based on one or more user interactions with the publication subsequent to the search query.

9. The method of claim 8, wherein the relevancy score is generated based on a number of publications having user interactions subsequent to the search query and a number of publications having the keyword in a title of the publication.

10. A system, comprising:
one or more hardware processors; and
a machine-readable storage device coupled to the one or more hardware processors, the machine-readable storage device comprising processor-executable instructions that, when executed by the one or more hardware processors, cause the one or more hardware processors to perform operations comprising:
identifying, by the one or more hardware processors, a first set of keywords based on a set of queries submitted to a publication system to search a first database of the publication system;
identifying a set of publications within the first database;
generating associations among keywords from the first set of keywords and publications from the set of publications;
generating associations among keywords of the first set of keywords based on historical search results of publications from the first database returned in response to the set of queries;

identifying a second set of keywords based on the first set of keywords by submitting the first set of keywords to a third-party server having a second database and receiving the second set of keywords in response;

generating associations among keywords from the second set of keywords and keywords from the first set of keywords;

identifying one or more gaps in content in the first database of the publication system based on a comparison of results from the first database and the second database for one or more keywords; and generating one or more user interfaces for generating and/or modifying content within the first database of the publication system based on: the associations among keywords from the first set of keywords and publications from the set of publications, the associations among keywords from the first set of keywords, and the associations among keywords from the first set of keywords and keywords from the second set of keywords, and the one or more gaps in content in the first database of the publication system.

11. The system of claim 10, wherein generating the associations among keywords from the first set of keywords and publications from the set of publications further comprises:

generating an array within the first database, the array mapping the first set of keywords to the set of publications; and mapping one or more of the first set of keywords and the set of publications with a set of categories of the set of publications.

12. The system of claim 10, wherein identifying the second set of keywords further comprises:

identifying a rank of one or more keywords of the second set of keywords within the second database;

identifying a frequency of use of one or more keywords of the second set of keywords within the second database; and identifying one or more periods of interest associated with one or more keywords of the second set of keywords within the second database.

13. The system of claim 10, wherein generating the associations among keywords of the first set of keywords further comprises:

identifying a frequency of presentation of one or more publications of the set of publications;

identifying a frequency of use for one or more keywords of the first set of keywords, the frequency of use indicating a number of times one or more keywords is used in a search query resulting in a publication of the set of publications; and identifying one or more related keywords among the first set of keywords.

14. The system of claim 10, wherein the one or more user interfaces cause presentation of a keyword in place of a keyword received by the one or more hardware processors based on the associations among keywords from the first set of keywords or the associations among keywords from the first set of keywords and keywords from the second set of keywords.

15. A non-transitory machine-readable storage device comprising processor-executable instructions that, when executed by one or more processors of a machine, cause the machine to perform operations comprising:

identifying, by the one or more processors, a first set of keywords based on a set of queries submitted to a publication system to search a first database of the publication system;

identifying a set of publications within the first database;

generating associations among keywords from the first set of keywords and publications from the set of publications;

generating associations among keywords of the first set of keywords based on historical search results of publications from the first database returned in response to the set of queries;

identifying a second set of keywords based on the first set of keywords by submitting the first set of keywords to a third-party server having a second database and receiving the second set of keywords in response;

generating associations among keywords from the second set of keywords and keywords from the first set of keywords;

identifying one or more gaps in content in the first database of the publication system based on a comparison of results from the first database and the second database for one or more keywords; and generating one or more user interfaces for generating and/or modifying content within the first database of the publication system based on: the associations among keywords from the first set of keywords and publications from the set of publications, the associations among keywords from the first set of keywords, and the associations among keywords from the first set of keywords and keywords from the second set of keywords, and the one or more gaps in content in the first database of the publication system.

16. The non-transitory machine-readable storage device of claim 15, wherein generating the associations among keywords from the first set of keywords and publications from the set of publications further comprises:

generating an array within the first database, the array mapping the first set of keywords to the set of publications; and mapping one or more of the first set of keywords and the set of publications with a set of categories of the set of publications.

17. The non-transitory machine-readable storage device of claim 15, wherein identifying the second set of keywords further comprises:

identifying a rank of one or more keywords of the second set of keywords within the second database;

identifying a frequency of use of one or more keywords of the second set of keywords within the second database; and identifying one or more periods of interest associated with one or more keywords of the second set of keywords within the second database.

18. The non-transitory machine-readable storage device of claim 15, wherein generating the associations among keywords of the first set of keywords further comprises:

identifying a frequency of presentation of one or more publications of the set of publications;

identifying a frequency of use for one or more keywords of the first set of keywords, the frequency of use indicating a number of times one or more keywords is used in a search query resulting in a publication of the set of publications; and identifying one or more related keywords among the first set of keywords.

19. The non-transitory machine-readable storage device of claim 15, wherein the operations further comprise:
receiving one or more keywords in a search query;
generating a set of publication results including one or more publications of the set of publications based on the one or more keywords in the search query;
determining a user selection of a publication of the set of publications after presentation of the set of publication results;
determining a subsequent user selection of a subsequent publication of the set of publications after presentation of the set of publication results; and
associating the publication and the subsequent publication with the one or more keywords within the associations among keywords from the first set of keywords and publications from the set of publications.

20. The non-transitory machine-readable storage device of claim 15, wherein the one or more user interfaces cause presentation of a keyword in place of a keyword received by the one or more processors based on the associations among keywords from the first set of keywords or the associations among keywords from the first set of keywords and keywords from the second set of keywords.

* * * * *